Aug. 5, 1969    G. V. LIEFFRING    3,459,910
ACTUATOR MECHANISM FOR VEHICLE WASHING CONTROLS
Filed Nov. 17, 1966
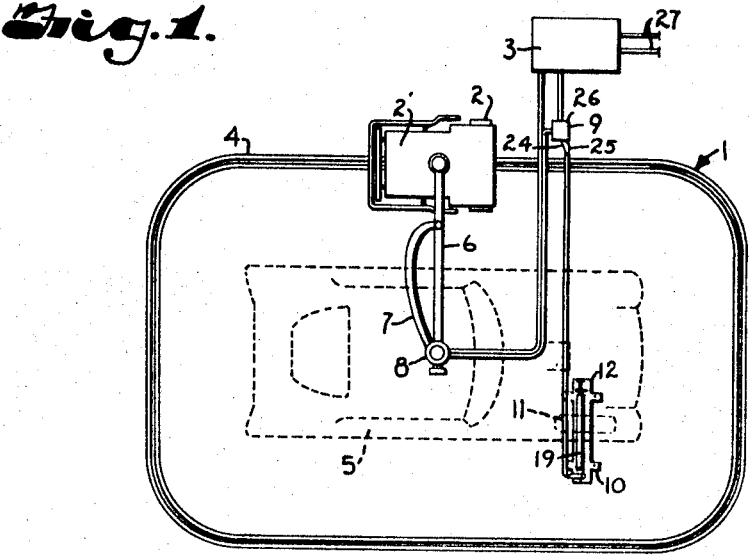
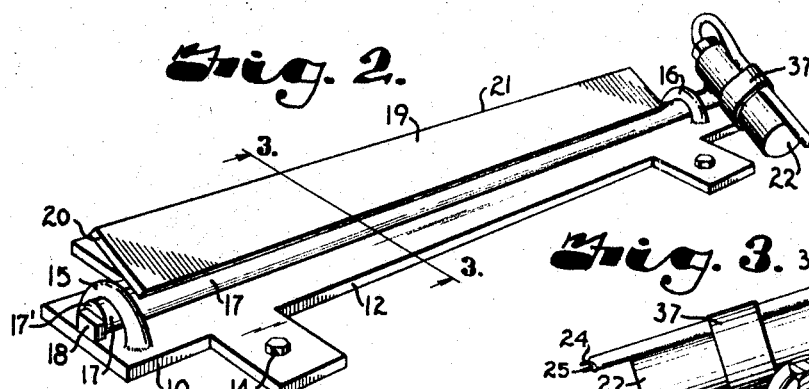
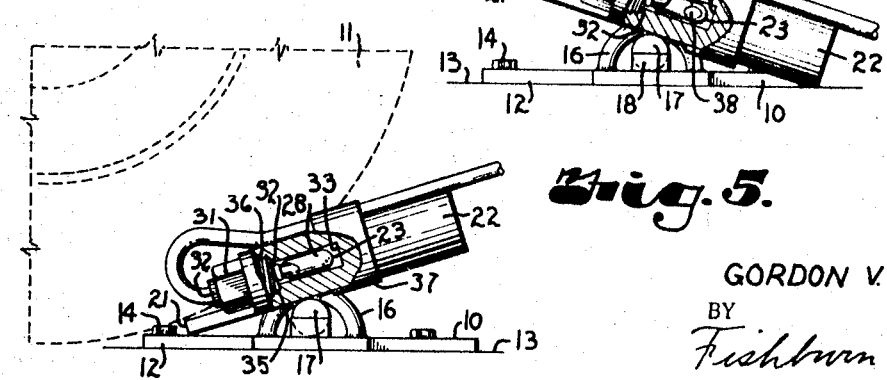
INVENTOR.
GORDON V. LIEFFRING
BY
Fishburn and Hoff
ATTORNEYS United States Patent Office 3,459,910
Patented Aug. 5, 1969

3,459,910
ACTUATOR MECHANISM FOR VEHICLE
WASHING CONTROLS
Gordon V. Lieffring, Kansas City, Mo., assignor to Robo-Wash, Inc., Kansas City, Mo., a corporation of Missouri
Filed Nov. 17, 1966, Ser. No. 595,202
Int. Cl. H01h 3/16
U.S. Cl. 200—61.41　　　　　　　　　　　　　　　6 Claims

ABSTRACT OF THE DISCLOSURE

An actuator mechanism operable by a vehicle wheel when the vehicle is in a washing position of apparatus wherein a mobile mechanism moves about the vehicle position to wash same and includes an electric circuit controlling the operation of the mobile mechanism. The actuator mechanism includes a base with an actuator plate in and transversely of the path of a vehicle wheel and swingably mounted by bearings on the base to be moved from a first position to a second position by engagement of the vehicle wheel. A weight member is connected to the actuator plate and operates to move the same from a second position to the first position when the wheel is moved from the actuator plate engaged position. A gravity type switch is arranged in the weight member to move therewith to make a circuit and permit operation of the vehicle washing mechanism only when the actuating plate is in the second position.

---

This invention relates to position control apparatus and more particularly to a vehicle position control for vehicle washing apparatus to assure proper location of the vehicle for washing.

In vehicle washing apparatus, particularly of the type having mechanism movable about a vehicle position to direct detergent and water against the vehicle, it is necessary that the vehicle be in the proper position otherwise it may be struck with parts of the washing mechanism, damaging either the mechanism, or the vehicle, or both. In washing apparatus wherein the washing operation is substantially automatic, the driver of the vehicle drives the same into the washing position and remains in the vehicle during the washing operation. This is particularly true as the driver may have difficulty in positioning the vehicle relative to lines or marks and efforts to move the vehicle to a different position may cause delays, customer dissatisfaction, as well as reduced quantity of washes.

The principal objects of this invention are: to provide apparatus actuated by the vehicle when in proper position to permit operation of the vehicle wash apparatus; to provide vehicle wash apparatus having an electric circuit controlling operation thereof with a switch that is in circuit interrupting position except when a vehicle is in proper position, said switch being actuated by mechanism engaged by the vehicle when moved into said proper position; to provide such an apparatus with a base having a swingable plate mounted in the path of a vehicle wheel and moved to depressed position when the vehicle wheel is resting thereon; to provide such a structure with weight means operatively connected to the swingable plate to move said plate to a raised position when disengaged from the vehicle wheel; to provide such a structure wherein a switch of the mercury type is mounted in the weight member and is inclined to effect movement to and from circuit making position in response to swinging of the plate member; and to provide a vehicle washing position control that is economical to manufacture, positive in operation and substantially unaffected by the materials used in the vehicle washing.

Other objects and advantages of this invention will become apparent from the following description taken in connection with the accompanying drawings wherein are set forth by way of illustration and example certain embodiments of this invention.

FIG. 1 is a plan view of a vehicle washing apparatus with a mobile unit shown in solid lines and movable in an orbit about the vehicle with the vehicle position shown in broken lines.

FIG. 2 is a perspective view of a switch mounting and actuating mechanism responsive to engagement of a vehicle wheel.

FIG. 3 is a transverse sectional view through the position control taken on the line 3—3, FIG. 2.

FIG. 4 is an end view of the positioned control apparatus with portions broken away to show the switch in circuit interrupting position.

FIG. 5 is an end view similar to FIG. 4 with the position control engaged by a vehicle wheel in circuit making position.

Referring more in detail of the drawings:

The reference numeral 1 generally designates a vehicle washing apparatus which includes mobile mechanism 2 driven by an electric motor 2', the apparatus includes electrical mechanism and circuit controls in a housing 3 which, when energized, effects movement of the mobile mechanism in a path indicated by a track 4 for movement about a vehicle 5 in a position to be washed and also effects supply of detergent and water and thereafter rinse water in high pressure sprays onto the vehicle from a spray mechanism 6. The spray mechanism is suitably supplied with such detergent and water through a connection 7 and a swivel member 8 connected with a source of water and detergent (not shown). Electric current also is supplied through the swivel connection 8 to the mobile washing mechanism 2 from the housing 3 and connected into the circuit is a relay 9 controlled by a position control mechanism 10.

The position control mechanism 10 is located in the path of a wheel 11 of the vehicle 5 whereby the control is actuated when the vehicle is in the proper position for washing as illustrated by broken lines, FIG. 1. The control mechanism 10 may be on either side of the vehicle path and the wheel 11 is preferably a front wheel, said mechanism 10 consists of a base member 12 suitably secured to a floor 13 by fastening devices such as bolts 14. The base member or plate 12 extends transversely of the path of the wheel 11 and has upstanding spaced bearing members 15 and 16 which in the structure illustrated are in the form of U-shaped loops that are secured to the plate 12. A shaft 17 is rotatably mounted in said bearing members 15 and 16 and preferably has one end 17' substantially engaged with an abutment 18 to limit longitudinal movement of said shaft.

A plate or treadle member 19 has one edge portion secured as by welding to the shaft 17 and extends substantially the distance between the bearing members 15 and 16 with a slight clearance between the end edges 20 of said member 19 and said bearing members prevent any interference with free swinging movement of the treadle plate 19. The plate 19 preferably extends from the shaft 17 in the direction the vehicle is moved into washing position whereby as the vehicle wheel 11 moves over the shaft 17 it engages the upper surface of the plate 19 and swings same downwardly engaging the forward edge 21 of said plate with the base member 12. When the plate 19 is disengaged from the wheel by the vehicle being moved out of the washing position the plate is swung to an upwardly inclined position as shown in FIG. 4 in response to action of a weight member 22 connected to the shaft 17.

In the structure illustrated the weight member 22 is generally cylindrical with one end portion secured to the shaft 17 exteriorly of the bearing member 16 whereby said weight extends from the shaft in a direction opposite to the plate 19 thereby providing the leverage from the weight to swing the plate to the upwardly inclined position. This treadle and weight member structure actuates a switch 23 that is in circuit as indicated by conductors 24 and 25 with a relay switch 26 that is in the leads 27 from a source of current to the electric circuit and controls in the washing apparatus 1. The relay 26 is such that when the switch 23 is in open position the circuit to the washing apparatus is interrupted and when the switch 23 is in circuit making position the relay 26 is moved to circuit making position whereby the washing apparatus can be operated only when the switch 23 is in circuit making position. In the structure illustrated the switch 23 is of a gravity actuated type such as a mercury switch which consists of a vial 28 having terminals 29 and 30 extending into one end thereof. The terminal end of the vial is mounted in sealed relation to a connector 31. The conductors 24 and 25 are in an insulated water-proof flexible covering 32 and extend into said connector 31, said covering being sealingly mounted therein and the conductors 24 and 25 being connected to the terminals 29 and 30 respectively. The weight member 22 has a bore 33 extending therein from the end 34 adjacent the shaft 17 and the connector 31 has a threaded portion 35 screwed into screw threads 36 adjacent the end of the bore 32 whereby the vial is positioned in the bore 33 in a substantially water-tight connection. The insulated conductors 24 and 25 extend in a bend from the connector 31 alongside the weight and are received thereto by a suitable fastener such as tape 37 or the like so there will be a minimum of bending of the conductors where they enter the connector 31.

In operation of a structure arranged as described and with the washing apparatus 2 being in a starting position, a vehicle 5 is driven into the washing area and moved within the track 4. The weight 22 is retaining the treadle plate 19 and structure in the position illustrated in FIG. 4 and as the vehicle 5 is moved forwardly the wheel 11 engages the plate 19 depressing same and rotating the shaft 17 to swing the weight 22 into inclined position as illustrated in FIG. 5. This causes the mercury 38 to engage the terminals to complete the circuit to the relay switch 26 which in turn moves into circuit making position for the leads to the washing apparatus thereby permit the washing operation to proceed and continue, however, if the vehicle is moved whereby the wheel 11 passes off the plate 19 the weight 22 automatically swings the structure and the switch 23 to the position illustrated in FIG. 4 wherein the circuit to the relay is interrupted, interrupting the circuit to the washing apparatus. Therefore, the structure assures that the vehicle is in the selected position before any washing operation can proceed, said position being predetermined whereby when the vehicle is so positioned the washing apparatus can safely move therearound.

It is to be understood that while I have illustrated and described one form of my invention it is not to be limited to the specific form or arrangement of parts herein described and shown except insofar as such limitations are included in the claims.

What I claim and desire to secure by Letters Patent is:

1. An actuator mechanism for a vehicle washing apparatus wherein a mobile mechanism is movable about a vehicle position for directing detergent and water against a vehicle in said position with an electric circuit controlling operation of said mobile mechanism, said actuator mechanism comprising:
    (a) a base member fixed in the path of a wheel of a vehicle moved to the washing position,
    (b) an elongate actuator plate extending transversely in the path of a vehicle moved to the wash position, means swingably mounting said actuator plate on said base member with the axis of swinging movement transversely of said vehicle path, said actuator plate having a rear portion adjacent said axis and extending therefrom in a direction toward which the vehicle is moved to washing position and being swingable from a first position to a second position by a vehicle wheel engaging same as the vehicle reaches the vehicle wash position, said actuator plate inclining downwardly from said rear portion in said second position and being held therein by the vehicle wheel when the vehicle is in the wash position,
    (c) a weight member connected to said actuator plate and operative to swing same upwardly from the second position to said first position in response to disengagement of the wheel therefrom by movement of the vehicle from the wash position,
    (d) stop portions engaged by the plate and weight member to limit swinging movement of the plate member to the movement between said first and second positions,
    (e) a switch supported by the weight member for movement therewith, said switch being connected to an electric circuit controlling operation of a vehicle wash mechanism,
    (f) said switch being actuated responsive to movement of the actuator plate and in circuit breaking position when the actuator plate is in the first position and in circuit making position permitting operation of the vehicle washing apparatus only when the actuator plate is in the second position.

2. An actuator mechanism as set forth in claim 1 wherein:
    (a) said base member being an elongate flat plate with upstanding bearing members thereon and spaced longitudinally thereof,
    (b) a shaft rotatably mounted in said bearing members with the axis of rotation transversely of the path of the vehicle wheel as it is moved into wash position,
    (c) said actuator plate being fixed to said shaft and extending therefrom in a direction toward which the vehicle is moved as it moves to the washing position whereby the vehicle wheel moves over the shaft and depresses the actuator plate.

3. An actuator mechanism as set forth in claim 2 wherein said base member includes a stop means engaged by said shaft to limit endwise movement of said shaft.

4. An actuator mechanism as set forth in claim 3 wherein the weight member is fixed to said shaft and extends therefrom substantially oppositely from the direction in which the plate member extends, and said switch is a gravity actuated switch positioned in said weight member.

5. An actuator mechanism as set forth in claim 4 wherein the weight member has a bore extending therein from one end and the switch is a mercury switch mounted in a water proof connector which is secured to said one end of the weight member in a water-tight connection.

6. An actuator mechanism as set forth in claim 5 wherein an insulated conductor extends from said connector in a loop and back alongside the weight member and is secured thereto whereby the secured position of the insulated conductor moves with the weight member and prevents relative movement between the conductor and connector at the point the conductor enters said connector.

References Cited

UNITED STATES PATENTS

| | | | |
|---|---|---|---|
| 1,114,451 | 10/1914 | Domser | 200—86 XR |
| 2,313,638 | 3/1943 | Granditz | 200—61.41 |
| 3,236,960 | 2/1966 | Larson | 200—61.41 |

ROBERT K. SCHAEFER, Primary Examiner

M. GINSBURG, Assistant Examiner